US012061117B2

(12) United States Patent
Corbett et al.

(10) Patent No.: US 12,061,117 B2
(45) Date of Patent: Aug. 13, 2024

(54) IMAGE SPECTRAL BAND TRANSLATION IN MULTISPECTRAL IMAGE APPLICATIONS

(71) Applicant: Microsoft Technology Licensing, LLC, Redmond, WA (US)

(72) Inventors: George Taylor Corbett, Rockville, MD (US); Michael Aaron Fore, Reston, VA (US); Christopher Allen Maxey, Arlington, VA (US); Mary Elizabeth Wahl, Pasadena, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 17/666,219

(22) Filed: Feb. 7, 2022

(65) Prior Publication Data

US 2023/0251131 A1 Aug. 10, 2023

(51) Int. Cl.
*G06T 5/50* (2006.01)
*G01J 3/28* (2006.01)

(52) U.S. Cl.
CPC .............. *G01J 3/2823* (2013.01); *G06T 5/50* (2013.01); *G01J 2003/2826* (2013.01); *G06T 2207/20081* (2013.01)

(58) Field of Classification Search
CPC ... G01J 3/2823; G01J 2003/2826; G06T 5/50; G06T 2207/20081; G06T 2207/20084
See application file for complete search history.

(56) References Cited

U.S. PATENT DOCUMENTS

| 2013/0093919 A1* | 4/2013 | Imai | H04N 25/11 |
| | | | 348/229.1 |
| 2020/0019825 A1* | 1/2020 | Frei | A01B 43/00 |

FOREIGN PATENT DOCUMENTS

| CN | 110991604 A | * | 4/2020 | ........... G06N 3/0445 |
| KR | 20230006306 A | * | 1/2023 | ............. G06T 11/60 |

OTHER PUBLICATIONS

Sudipan Saha, "Unsupervised Deep Transfer Learning-Based Change Detection for HR Multispectral Images", 5, May 2021 (Year: 2021).*
Jason Brownlee, "How to Develop an Auxiliary Classifier GAN (AC-GAN) From Scratch with Keras" https://machinelearningmastery.com/how-to-develop-an-auxiliary-classifier-gan-ac-gan-from-scratch-with-keras/, Jul. 19, 2019 (Year: 2019 ).*

(Continued)

*Primary Examiner* — Maurice C Smith
(74) *Attorney, Agent, or Firm* — Calfee, Halter & Griswold LLP

(57) ABSTRACT

First image data including a plurality of values representing the image in one or more first spectral bands of an electromagnetic spectrum is received. Second image data including a plurality of values representing the image in one or more second spectral bands of the electromagnetic spectrum is determined based on the first image data. The one or more second spectral bands of the electromagnetic spectrum include at least one spectral band not included in the one or more first spectral bands of the electromagnetic spectrum. The second image data is stored in a memory and/or provided to a user device for displaying the image in one or more second bands of the electromagnetic spectrum to a user of the user device.

20 Claims, 11 Drawing Sheets

(56) References Cited

OTHER PUBLICATIONS

Rama, "File:Sentinel 2-IMG 5873-white (crop).jpg", Retrieved from: https://commons.wikimedia.org/wiki/File:Sentinel_2-IMG_5873-white_(crop).jpg, Sep. 8, 2020, 3 Pages.
"Harmonized Landsat Sentinel-2", Retrieved from: https://hls.gsfc.nasa.gov/, Sep. 19, 2018, 1 Page.
Isola, et al., "Image-to-Image Translation with Conditional Adversarial Nets", Retrieved from: https://phillipi.github.io/pix2pix/, 2017, 3 Pages.
KääB, et al., "Glacier Remote Sensing Using Sentinel-2. Part I: Radiometric and Geometric Performance, and Application to Ice Velocity", In Journal of Remote Sensing 2016, vol. 8, Issue 7, Jul. 15, 2016, pp. 1-24.
Skakun, et al., "Harmonized Landsat Sentinel-2 (HLS) Product User's Guide", Retrieved from: https://hls.gsfc.nasa.gov/wp content/uploads/2019/01/HLS.v1.4.UserGuide_draft_ver3.1.pdf, Dec. 2018, pp. 1-30.

* cited by examiner

IMAGE SPECTRAL BAND TRANSLATION IN MULTISPECTRAL IMAGE APPLICATIONS

BACKGROUND

Spectral imaging, such as imaging obtained using sensors disposed on satellites, drones, internet of things (IoT) devices, etc. is used in many imaging applications, such as applications in agricultural, manufacturing, health care, and public safety sectors. Spectral imagery is typically utilized to obtain images in the visual portion of the electromagnetic spectrum. Thus, for example, red, green, and blue (RGB) images of various scenes and domains are often easily obtained and readily available for the various imaging applications. Many current systems, however, require or may benefit from multispectral imagery that includes non-visual portions of the electromagnetic spectrum, such as near infrared, short-wave infrared, and other spectral bands in the electromagnetic spectrum. Collecting electro-optical imagery from such spectral bands is often not possible due to a significant cost associated with purchasing and deploying multispectral sensors. Moreover, electro-optical imagery that is collected by various sensor devices may not be easily obtainable by the various applications. For example, transmission of image data that may be captured by sensors disposed on a satellite may take a relatively large amount of time and/or may occupy a prohibitive amount of network bandwidth.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure are directed to improving image processing in computer vision applications.

In aspects, a method for processing images is provided. The method includes receiving first image data representing an image, the first image data comprising a plurality of values representing the image in one or more first spectral bands of an electromagnetic spectrum. The method also includes determining, using an image spectral band translation system, second image data based on the first image data, the second image data comprising a plurality of values representing the image in one or more second spectral bands of the electromagnetic spectrum, the one or more second spectral bands of the electromagnetic spectrum including at least one spectral band not included in the one or more first spectral bands of the electromagnetic spectrum. The method further includes performing one or both of i) storing the second image data in a memory and ii) providing the second image to a user device for displaying the image in one or more second bands of the electromagnetic spectrum to a user of the user device.

In further aspects, a system is provided. The system includes one or more computer readable storage media and program instructions stored on the one or more computer readable storage media that, when executed by at least one processor, cause the at least one processor to perform operations. The operations include receiving a plurality of training images and training a machine learning model based on the plurality of training images to translate image data corresponding to one or more first spectral bands of an electromagnetic spectrum to image data corresponding to one or more second spectral bands in the electromagnetic spectrum, the one or more second spectral bands including at least one spectral band not included in the one or more first spectral bands. The operations also include storing the trained machine learning model in a memory for subsequent use of the trained model to translate image data corresponding to one or more first spectral bands of an electromagnetic spectrum to image data corresponding to one or more second spectral bands in the electromagnetic spectrum.

In still further aspects, a computer storage medium is provided. The computer storage medium stores computer-executable instructions that when executed by at least one processor cause a computer system to perform operations. The operations include receiving first image data representing an image, the first image data comprising a plurality of values representing the image in one or more first spectral bands of an electromagnetic spectrum. The operations also include determining, using a machine learning model, second image data based on the first image data, the second image data comprising a plurality of values representing the image in one or more second spectral bands of the electromagnetic spectrum, the one or more second spectral bands of the electromagnetic spectrum including at least one spectral band not included in the one or more first spectral bands of the electromagnetic spectrum. The operations further include performing one or both of i) storing the second image data in a memory and ii) providing the second image to a user device for displaying the image in one or more second bands of the electromagnetic spectrum to a user of the user device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects disclosed herein may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, an image spectral band translation system translates image data representing an image in one or more first spectral bands to image data representing the image in one or more second spectral bands, where the one or more second spectral bands include at least one spectral band not included in the one or more first spectral bands. As an example, the image data translation system may translate image data representing an image in the red, green, and blue (RGB) visible light spectral bands to image data representing the image in one or more non-visible spectral bands, such as, for example, one or more of shortwave infrared (SWIR) spectral bands, near infrared (NIR) spectral bands, cirrus spectral band, etc. Thus, in aspects, the image data translation system may synthesize a desired image in particular one or more second spectral bands from an image (e.g., RGB image) that may be available in the one or more first spectral bands. In these ways, images in the particular one or more second spectral bands may be obtained without the cost of deploying physical sensors in the particular spectral bands and/or without occupying bandwidth for transmission of image data corresponding to the particular one or more spectral bands.

Figure 1:
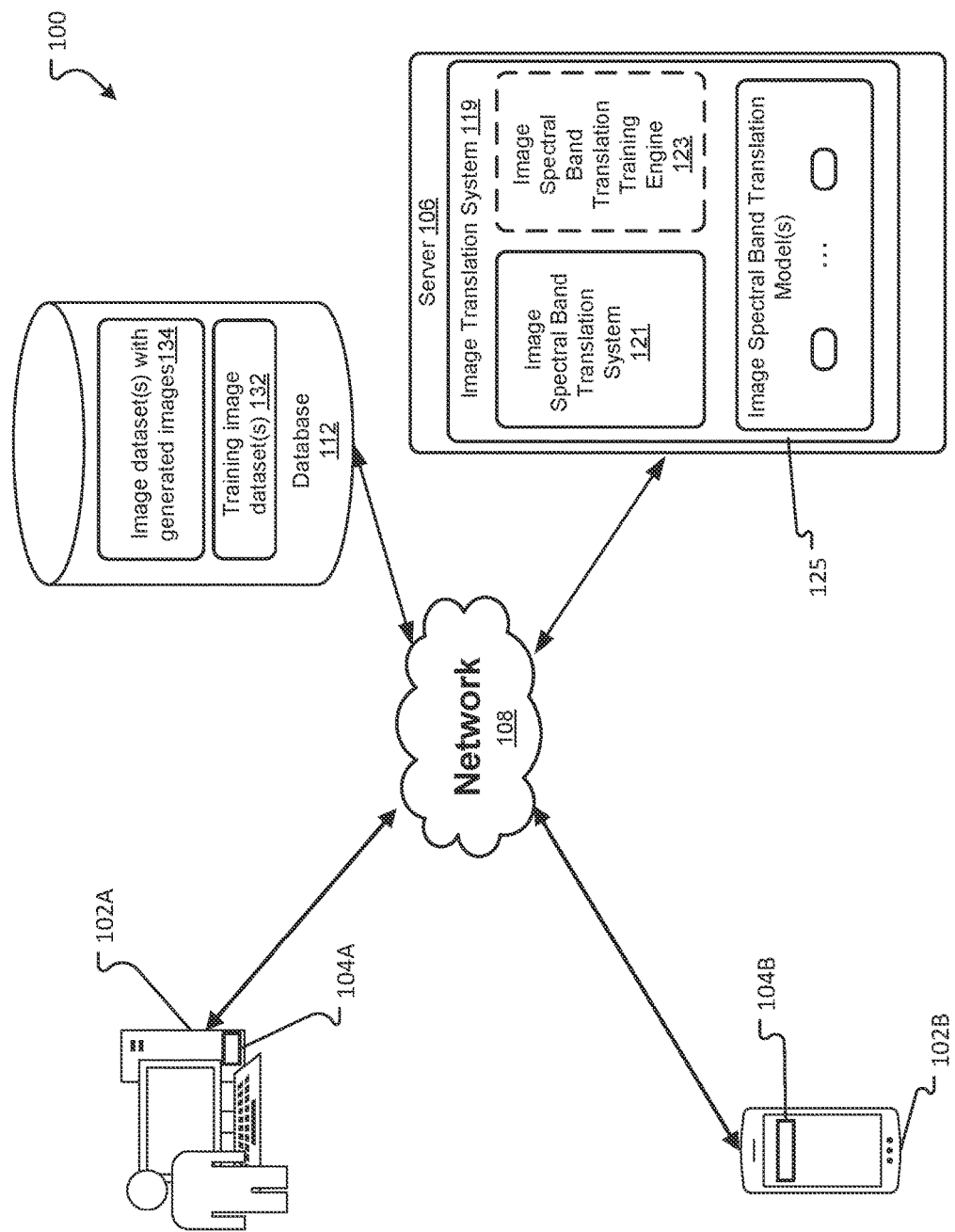
FIG. 1 is a block diagram of an example system in which an image spectral band translation system may be utilized, in accordance with aspects of the present disclosure.

FIG. 1 is a block diagram of an example system 100 in which an image spectral band translation system may be utilized, in accordance with aspects of the present disclosure. The system 100 may include a plurality of user devices 102 (i.e., 102A and 102B) that may be configured to run or otherwise execute client applications 104. The user devices 102 may include, but are not limited to, laptops, tablets, smartphones, and the like. The client applications 104 (i.e., 104A and 104B) may allow users of the user devices 102 to perform various imagery operations, such as, for example, to train and/or deploy computer vision models to process images in various electromagnetic spectral bands. In some examples, the applications 104 may include web applications, where such applications 104 may run or otherwise execute instructions within web browsers. In some examples, the applications 104 may additionally or alternatively include native client applications residing on the user devices 102.

The user devices 102 may be communicatively coupled to a computing device 106 via a network 108. The computing device 106 may be a server or other computing platform generally accessible via the network 108. The computing device 106 may be a single computing device as illustrated in FIG. 1, or the computing device 106 may comprise multiple computing devices (e.g., multiple servers) that may execute the applications in a distributed manner. The network 108 may be a wide area network (WAN) such as the Internet, a local area network (LAN), or any other suit able type of network. The network 108 may be single network or may be made up of multiple different networks, in some examples. The system 100 may also include a database 112. The database 112 may be communicatively coupled to the computing device 106 and/or to the one or more user devices 102 via the network 108, as illustrated in FIG. 1, or may be coupled to the computing device 106 and/or to the one or more user devices 102 in other suitable manners. For example, the database 112 may be directly connected to the computing device 106, or may be included as part of the computing device 106, in some examples. The database 112 may be a single database or may include multiple different databases.

The computing device 106 may be configured to run or otherwise execute an image translation system 119. The image translation system 119 may, in turn, include an image spectral band translation system 121. In some aspects, the image translation system 119 may also include an image spectral band translation training engine 123. The image spectral band translation system 121 may be configured to receive image data representing an image in one or more first spectral bands in the electromagnetic spectrum and to translate the image data into image data representing the image in one or more second spectral bands in the electromagnetic spectrum. The image spectral band translation system 121 may thus synthesize an image in the one or more second spectral bands based on image data representing the image in the one or more first spectral bands. As an example, the image spectral band translation system 121 may receive image data representing an image in red, green, and blue (RGB) spectral bands and translate the image data into image data representing the image in the shortwave infrared 1 (SWIR 1) spectral band. The image spectral band translation system 121 may thus synthesize an image in the SWIR 1 spectral band based on image data captured in the RGB spectral bands. As another example, the image spectral band translation system 121 may receive image data representing an image in red-edge, NIR–, and water vapor spectral bands and translate the image data into image data representing the image in the SWIR 1 spectral band. The image spectral band translation system 121 may thus synthesize an image in the SWIR 1 spectral band based on image data captured in the red-edge, the NIR and the water vapor spectral bands. In other aspects, the image spectral band translation system 121 may synthesize an image in one or more spectral bands other than the SWIR 1 band and/or based on image data captured in one or more spectral bands other than red, green, blue, red-edge, NIR and water vapor spectral bands. For example, in some aspects, the image spectral band translation system 121 may synthesize an image in the NIR narrow and/or the NIR broad spectral band.

In an aspect, the image spectral band translation system 121 may be configured to receive image data corresponding to a subset of one or more spectral bands of an image and may synthesize image data corresponding to one or more other spectral bands that were captured in an image. In aspects, the image data corresponding to the one or more spectral bands in the image may be received from a satellite that captured the image, where image data transmitted from the satellite included the image data corresponding to the subset of the one or more spectral bands and omitted image data corresponding to one or more other spectral bands, for example to reduce the amount of time and bandwidth needed for image data transmission. In an example, the image spectral band translation system 121 may synthesize image data representing an image in one or more of the red, the blue and the green spectral bands based on image data representing an image in the other one or more of the red, the green, and the blue spectral bands. For example, in an aspect, the image spectral band translation system 121 may receive compressed image data corresponding to an RGB image, the compressed imaged data omitting image data of one or more of the red, the green and the blue spectral components of the RGB image. The image spectral band translation system 121 may then synthesize the missing one or more one or more of the red, the green and the blue spectral components of the RGB image based on the received image data corresponding to the other one or more of the red, the green and the blue spectral components of the RGB image. As just an example, the image spectral band translation system 121 may synthesize the red spectral component of an RGB image based on received image data representing the green and the blue spectral components of the RGB image. The RGB image may thus be recreated based on the synthesized image data representing the red spectral component of the RGB image and the received image data representing the green and the blue spectral components of the RGB image.

In an aspect, the image data generated by the image spectral band translation system 121 may be stored in a memory or other suitable storage device. For example, the image data generated by the image spectral band translation system 121 may be stored as a part of a training data set 134 in the database 112. Such stored training data set 134 that may subsequently be used for training suitable computer vision models with image data in the one or more second spectral bands. For example, the image spectral band translation system 121 in the training data set 134 may be obtained from the database 112 by a user device 102 via the network 108, and may then be used for training suitable computer vision models by an application 104 executing or otherwise running on the user device 102. Additionally or alternatively, the image data generated by the image spectral band translation system 121 may be provided, in some form, to a user device 102 for displaying the image in one or more second spectral bands of the electromagnetic spectrum to a user of the user device 102. For example, the image data generated by the image spectral band translation system 121 may be transmitted, in some form, to a user device 102 via the network 108. The image data generated by the image spectral band translation system 121 may then be displayed to a user, for example in a user interface of an application 104 running or otherwise executing on the user device 102.

In aspects, the image spectral band translation system 121 may perform spectral band translation using one or more image spectral band translation models 125 that may be trained or otherwise configured to synthesize image data corresponding to particular spectral bands. In an aspect, an image spectral band translation model 125 may comprise a neural network trained to synthesize image data in particular one or more spectral bands based on image data in other particular one or more spectral bands. In an aspect, an image spectral band translation model 125 may comprise a generative adversarial network (GAN), such as a conditional generative adversarial network (cGAN). In other aspects, the image translation model 125 may comprise a suitable neural network other than a GAN or may utilize a suitable model other than a neural network.

The image spectral band translation training engine 123 may be configured to train the one or more image spectral band translation models 125 to perform image translation. In an aspect, the image spectral band translation training engine 123 may train the one or more one or more image spectral band translation models 125 using one or more image datasets 132 that may be stored in the database 112 or may be otherwise accessible by the computing device 106. The one or more image datasets 132 may include image data for images in a plurality of spectral bands. The image data may correspond to images captured by satellite sensors, internet of things (IoT) device sensors, drone sensors, etc., that may be configured to capture images in the plurality of spectral bands. In aspects, the plurality of spectral bands may include red, green, and blue bands, near infrared band, short-wave infrared band, long-wave infrared band, red-edge band, cirrus band, and/or any other suitable spectral bands. The image spectral band translation training engine 123 may utilize training images in one or more first spectral bands and one or more target images in one or more second spectral bands to train an image spectral band translation model 125 to translate images from the one or more first spectral bands to the one or more second spectral bands, in various embodiments. In an aspect, respective ones of the image spectral band translation models 125 may be trained to translate images from respective first spectral bands to the one or more second spectral bands and/or may be trained to translate images from the one or first spectral bands respective one or more second spectral bands. As just an example, the image spectral band translation training engine 123 may train a first image spectral band translation model 125 to translate images from the red, green, and blue spectral bands to the SWIR 1 spectral band and may train a second image spectral band translation model 125 to translate images from the red-edge, the NIR and the water vapor spectral bands to the SWIR 1 spectral band. In other aspects, the image spectral band translation training engine 123 may train respective one or more image spectral band translation models 125 to translate images from spectral bands other than red, green, blue, red-edge, NIR and water vapor bands and/or to one or more spectral bands other than the SWIR 1 spectral band.

Referring still to FIG. 1, it should be appreciated while the image spectral band translation system 121 and the image spectral band translation training engine 123 are illustrated as being executed on the computing device 106, the image spectral band translation system 121 and/or the image spectral band translation training engine 123 may be at least partially executed at a client application 104 of a client device 102 and/or at least partially executed at a device separate from the computing device 106 and the client device 102. As an example, in aspects, the image translation system the image spectral band translation system 121 may be at least partially residing on and executing a computing device onboard a satellite that is configured to obtain images. In some aspects, the computing device onboard the satellite may determine, using the image spectral band translation system 121, whether a subset of one or more spectral bands in a particular image can be used to accurately reconstruct one or more other bands in the particular image. When it is determined that the subset of one or more spectral bands can be used to accurately reconstruct one or more other bands in the particular image, the satellite may transmit image data for the subset of the one or more spectral bands for the image and omit image data for the other one or more spectral bands, in at least some aspects, to reduce the amount of time and bandwidth of image data transmission, for example.

Figure 2:
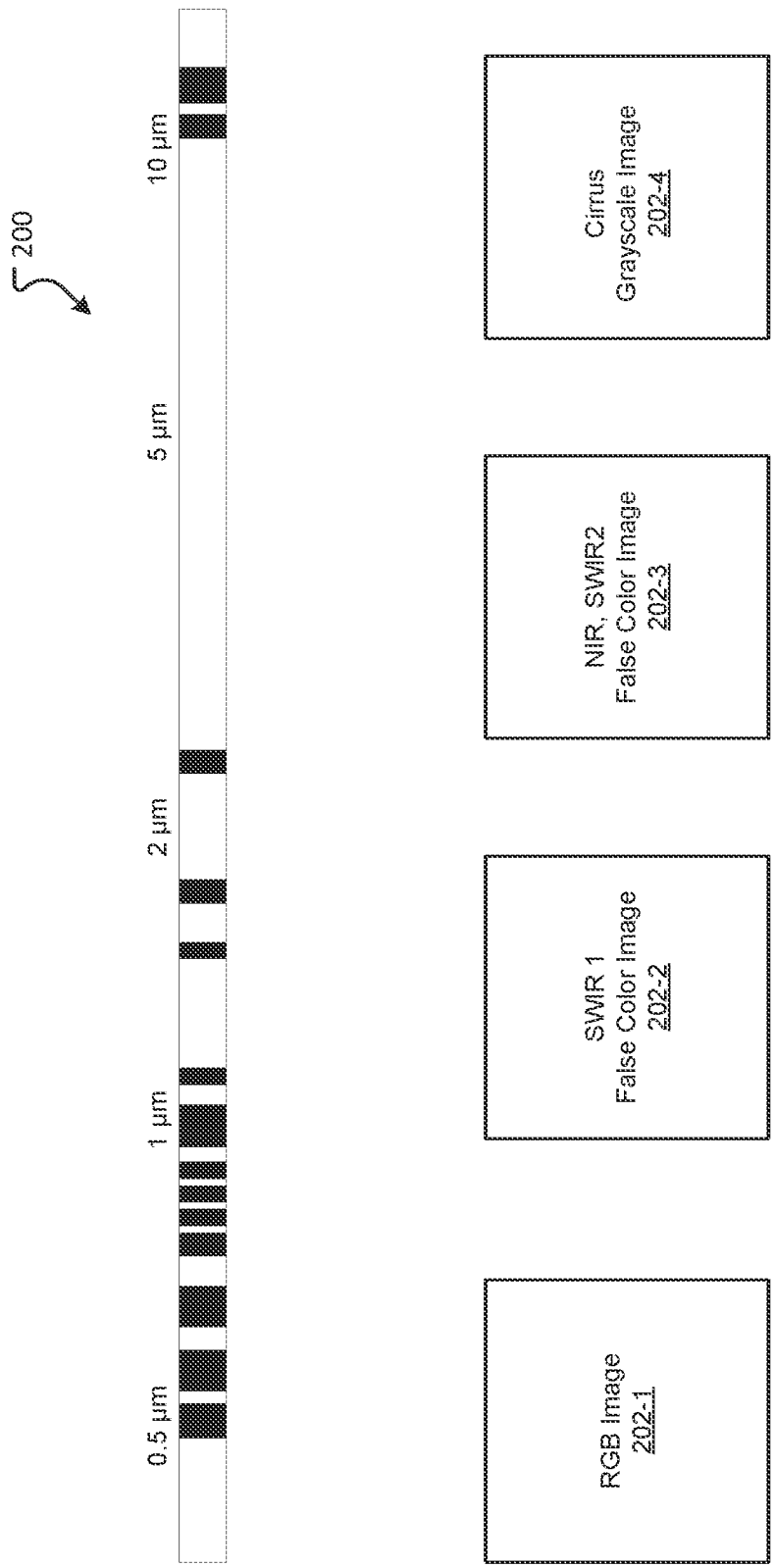
FIG. 2 is a diagram depicting an example electromagnetic spectrum and example images for which image spectral band translation may be performed, in accordance with aspects of the present disclosure.

FIG. 2 is a diagram depicting an example electromagnetic spectrum 200 and example images 202 for which image band to band translation may be performed, in accordance with aspects of the present disclosure. The image spectral band translation system 121 of FIG. 1 may be configured to translate an image in one or more first bands in the electromagnetic spectrum 200 into an image in one or more second bands in the electromagnetic spectrum 200. In other aspects, the image spectral band translation system 121 of FIG. 1 may be configured to translate images in spectral bands in an electromagnetic spectrum range different from the electromagnetic spectrum 200.

The electromagnetic spectrum 200 includes a plurality of spectral bands containing wavelengths of light in the range at least substantially equal to a 0.4 micrometer (µm) to 13 µm wavelength range. In an aspect, the electromagnet spectrum 200 includes thirteen spectral bands, including i) the coastal aerosol band (0.43-0.45 µm), ii) the blue band (0.45 µm-0.51 µm), iii) the green band (0.53 µm-0.59 µm), iv) the red band (0.64 µm-0.67 µm), v) the red-edge 1 band (0.69 µm-0.71 µm), vi) the red-edge 2 band (0.73 µm-0.75 µm), vii) the red-edge 3 band (0.77 µm-0.79 µm), viii) the NIR band (0.78 µm-0.88 µm), including the NIR narrow band (0.85 µm-0.88 µm), ix) the water vapor band (0.93 µm-0.95 µm), x) the cirrus band (1.36 µm-1.38 µm), xi) the SWIR 1 band (1.57 µm-1.65 µm), and xii) the SWIR 2 band (2.11 µm-2.29 µm). In other aspects, the electromagnetic spectrum 200 may include fewer or more spectral bands and/or includes one or more spectral bands different from the i)-xii) spectral bands.

The images 202 include a first image 202-1 (RGB image) in the red band, green band, and the blue band, a second image 202-2 (false color image) in the SWIR 1 band, a third image 202-3 (false color image) in the NIR band and the SWIR 2 band, and a fourth image 202-4 (grayscale image) in the cirrus band. In an aspect, the image spectral band translation models 125 of FIG. 1 may be trained to translate a first image 202 in one or more first bands into a second image 202 in one or more second bands. As just an example, an image spectral band translation model 125 may be configured to translate an RGB image such as the image 202-1 into an SWIR 1 false color image such as the image 202-2. As just another example, an image spectral band translation model 125 may be configured to translate an SWIR 1 false color image such as the image 202-2 into another false color image such as the image 202-3 or into a grayscale image such as the image 202-4. Generally, in various aspects, an image spectral band translation model 125 may be configured to translate an image in any suitable combination of one or more first bands in the spectrum 200 into the image in any suitable combination of one or more second bands in the spectrum 200. For example, an image spectral band translation model 125 may be configured to translate an image in any suitable combination of one or more first bands in the spectrum 200 into an image in one or more of the SWIR 1 spectral band, the NIR broad spectral band and NIR narrow spectral band.

Figure 3:
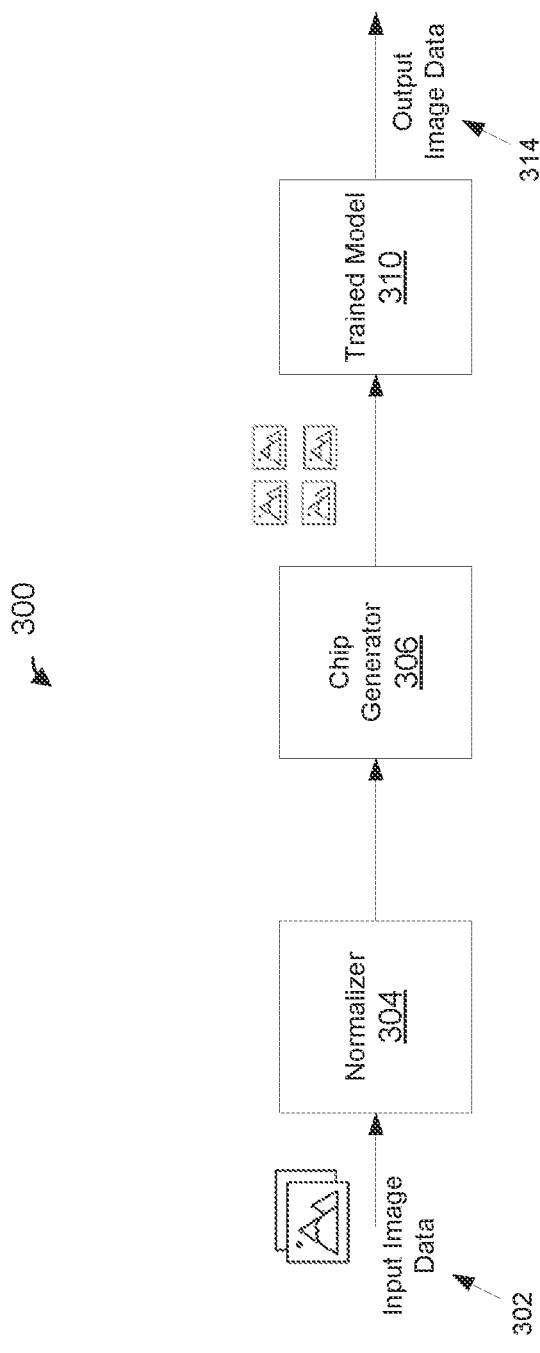
FIG. 3 is a block diagram of an example image spectral band translation system, in accordance with aspects of the present disclosure.

FIG. 3 is a block diagram of an example image spectral band translation system 300, in accordance with aspects of the present disclosure. The image spectral band translation system 300 may correspond to the image spectral band translation system 121 of FIG. 1. In other aspects, the image spectral band translation system 300 may be utilized with a system different from the system 100 of FIG. 1. Similarly, the image spectral band translation system 121 of FIG. 1 may be different from the image spectral band translation system 300, in some examples.

The image spectral band translation system 300 may receive input image data 302 including image data for one or more first spectral bands in an image. In an aspect, the input image data 302 may comprise image data obtained from a satellite, a drone, and IoT device, etc., that may be equipped with one or more sensors configured to capture images in the one or more first spectral bands. In another aspect, the input image data 302 may comprise image data synthesized by an image synthesis system configured to synthesize images in the one or more first spectral bands. The input image data 302 may include respective sets of input image data for respective ones the one or more spectral bands in the image. In an aspect, the input image data 302 may include three sets of input image data for respective ones of three spectral bands in the image. For example, in an aspect in which the image is an RGB image, the input image data 302 may include a first set of input image data including image data for the red band, a second set of input image data including image data for the green band and a third set of input image data including image data for the blue band. As just another example, in an embodiment in which the image is a false color image, the input image data 302 includes a first set of input image data including image data for a red-edge band (e.g., the red-edge 3 band), a second set of input image data including image data for an NIR band (e.g., the NIR narrow band) and a third set of input image data including image data for the water vapor spectral band. In other aspects, the input image data 302 includes sets of input image data for other spectral bands. In some aspects, the input image data 302 includes respective sets of input image data for a number of spectral bands different than three spectral bands (e.g., 1, 2, 4, 5, 6, etc.).

The image spectral band translation system 300 may include a normalizer 304, a chip generator 306 and a trained model 310. The normalizer 304 may normalize the input image data 304. For example, the normalizer 304 may normalize values of pixels in the input image data 302 so that the values of pixels are within a range suitable for the trained model 310. For example, in an aspect in which the input image data 302 includes relatively high fidelity satellite pixel data, the normalizer 302 may reduce fidelity of the pixel data. In an example, the normalizer 304 may normalize values of pixels in the input image data 302 so that the value of each pixel in the input image data 302 are within the 0 to 255 range corresponding to an eight bit integer. In some aspects in which the input image data 302 includes image pixel values that are within the range suitable for the trained model 310, the normalizer 304 may be omitted or may be configured to pass the input image data without normalization.

The chip generator 306 may process the input image data 302 (or input image data normalized by the normalizer 304) to generate multiple sets of image data corresponding to multiple chips of the image. For example, in an aspect in which the image may be too large to be stored in a memory for processing by the trained model 310 as a single image, the chip generator 306 may cut up the image into multiple chips and store image data corresponding to the multiple chips in the memory for processing by the trained model 310. In some aspects in which the input image data 302 corresponds to a relatively smaller image that is not too large for the trained model 310, chip generator 306 may be omitted or may be configured to pass the input image data without chipping.

The trained model 310 is configured to translate input image data representing the image in the one or more first spectral bands into output image data 314 corresponding to the image in one or more second spectral bands. In an aspect, the trained model 310 corresponds to an image spectral band translation model 125 of FIG. 1. In another aspect, the trained model 310 is different from the image spectral band translation models 125 of FIG. 1. In an aspect, whereas the input image data 302 includes RGB image data for an image, the output image data 314 includes SWIR 1 band image data for the image or includes image data for one or more spectral bands other than the SWIR 1 band. In another aspect, whereas the input image data 302 includes image data for one or more spectral bands of a multispectral image, the output image data 314 may include image data for other one or more spectral bands that may be missing from the input image data 302 for the multispectral image. In this aspect, the trained model 310 may synthesize image data for one or more spectral bands that may be missing from the input image data 302 for the multispectral image. The output image data 314 may then be combined with the input image data 302 to recreate the multispectral image. As just an example, whereas the input image data 302 includes image data for one or two of the red, green, and blue spectral bands of an RGB image, the output image data 314 may include image data for the other one or two of the red, green, and blue spectral bands of the RGB image. In this case, the output image data 314 may be combined with the input image data 302 to recreate the RGB image.

Figure 4:
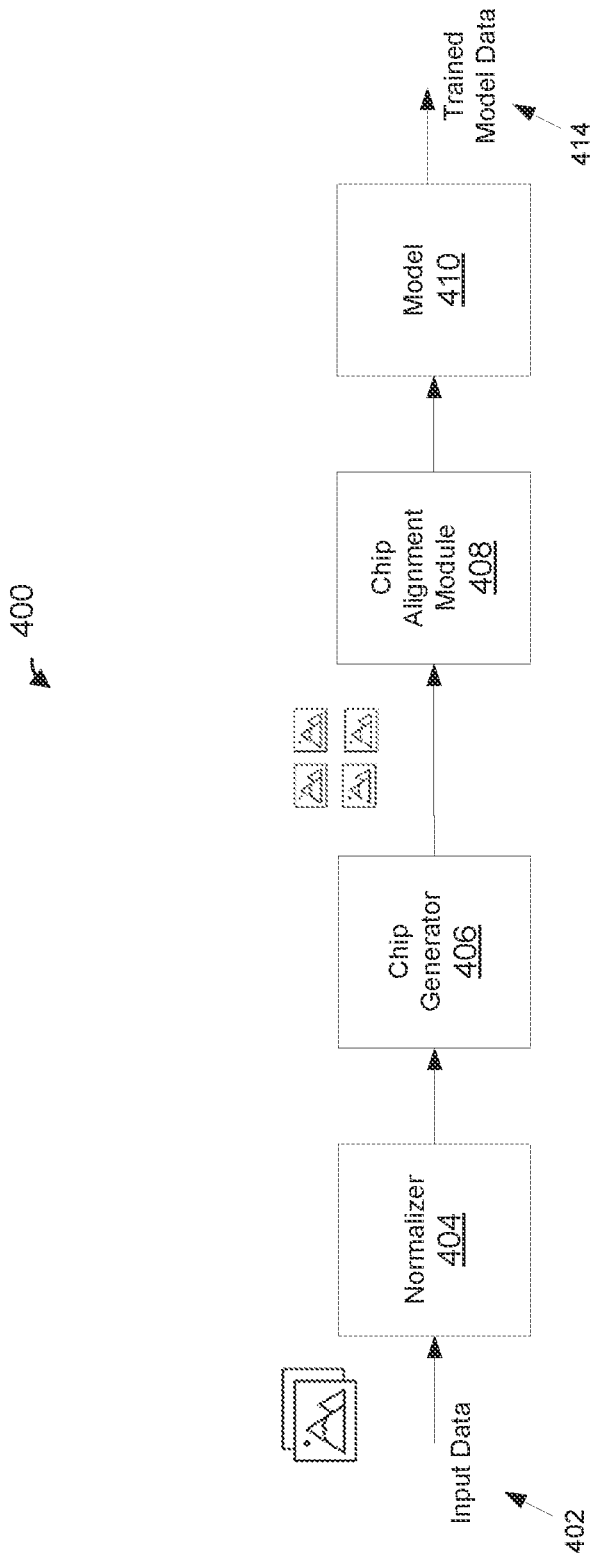
FIG. 4 is a block diagram of an example image spectral band translation model training engine, in accordance with aspects of the present disclosure.

FIG. 4 is a block diagram of an example image translation model training engine 400, in accordance with aspects of the present disclosure. In an aspect, the image translation model training engine 400 includes like-numbered components that are the same as or similar to the corresponding components of the image spectral band translation system 300 of FIG. 3. Input image data 402 may generally comprise image data same as or similar to the input image data 302 of FIG. 3. In an aspect, input image data 402 may include image data for respective ones of a plurality of training images in one or more first spectral bands. Additionally, the input image data 402 may include image data for a plurality of corresponding target images in one or more second spectral bands.

The input image data 402 may be processed by a normalizer 404 and a chip generator 406 in the manner described above with respect to FIG. 3. In some aspects, the normalized 404 and/or the chip generator 406 may be omitted from the image translation model training engine 400 or may be configured to pass the data without normalization and/or chipping as described above with respect to FIG. 3. Normalized and/or chipped image data may then be provided to an alignment module 408. The chip alignment module 408 may align image data for each chip in a training image in the one or more first spectral bands with image data for each chip of a corresponding target image in the one or more second spectral bands. The aligned data may then be provided to a model 410. The model 410 may be configured to learn mappings from the image data from the training images and the image data for the corresponding target image. The model 410 may thus generate trained model data 414 that may be utilized as the trained model 310 of FIG. 3 to translate image data for an arbitrary image in the one or more first spectral bands to a corresponding image in the one or more second spectral bands.

Figure 5:
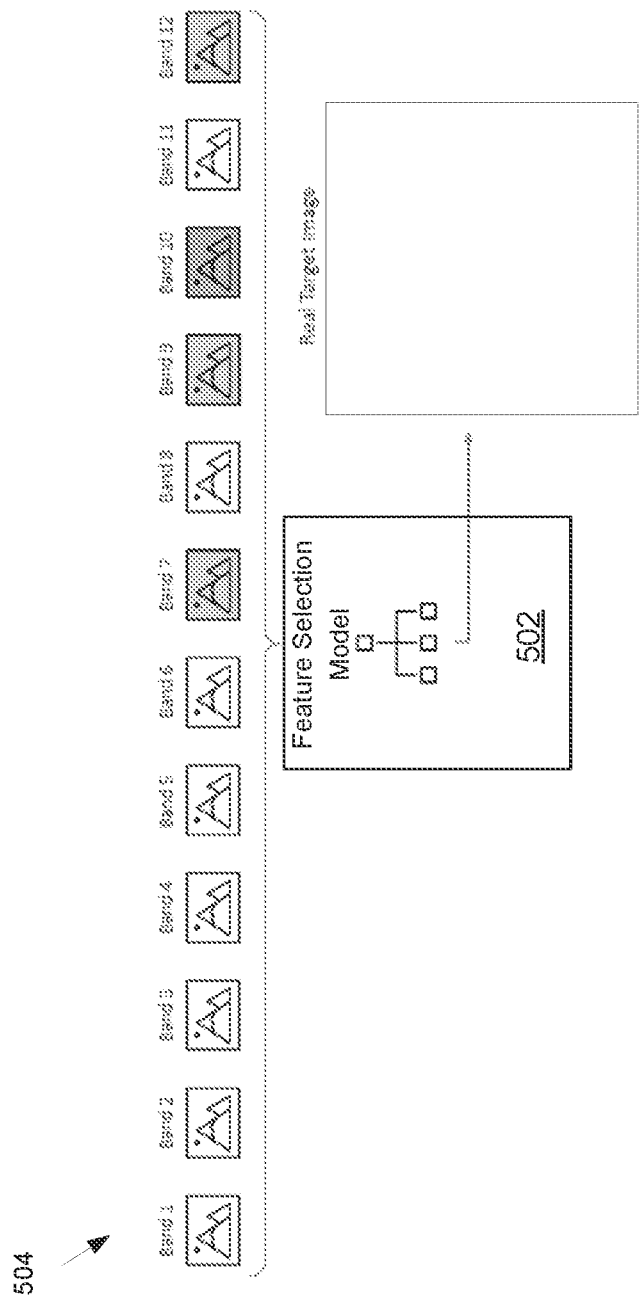
FIG. 5 is a diagram depicting an example spectral band system for selecting one or more first image spectral bands to be used for translation into one or more second spectral bands, in accordance with aspects of the present disclosure.

FIG. 5 is a diagram depicting an example spectral band system 500 for selecting one or more first image spectral bands to be used for translation into one or more second spectral bands, in accordance with aspects of the present disclosure. In an aspect, the spectral band selection system 500 may include a feature selection model 502 that may process image data in a plurality of first spectral bands 504 to select one or of the spectral bands 504 that may be used to best predict image data in one or more particular second spectral bands 504. In an aspect, the feature selection model 502 may comprise a random forest selection model. In another aspect, the feature selection model 502 may comprise a suitable selection model different from the random forest selection model. The plurality of spectral bands 504 may include the spectral bands of the electromagnetic spectrum 200 as described above with respect to FIG. 2. The feature selection model 502 may then select one or more spectral bands of the electromagnetic spectrum 200 that may best be used for generating image data in another one or more spectral bands of the electromagnetic spectrum 200. As just an example, the feature selection model 502 may select the red-edge 3 band, the NIR narrow band and the water vapor band as the spectral bands that may best be used for generating image data in the SWIR 1 band. The image data for the spectral bands selected by the feature selection model 502 may then be used for training the model 410 of FIG. 4, for example.

Figure 6:
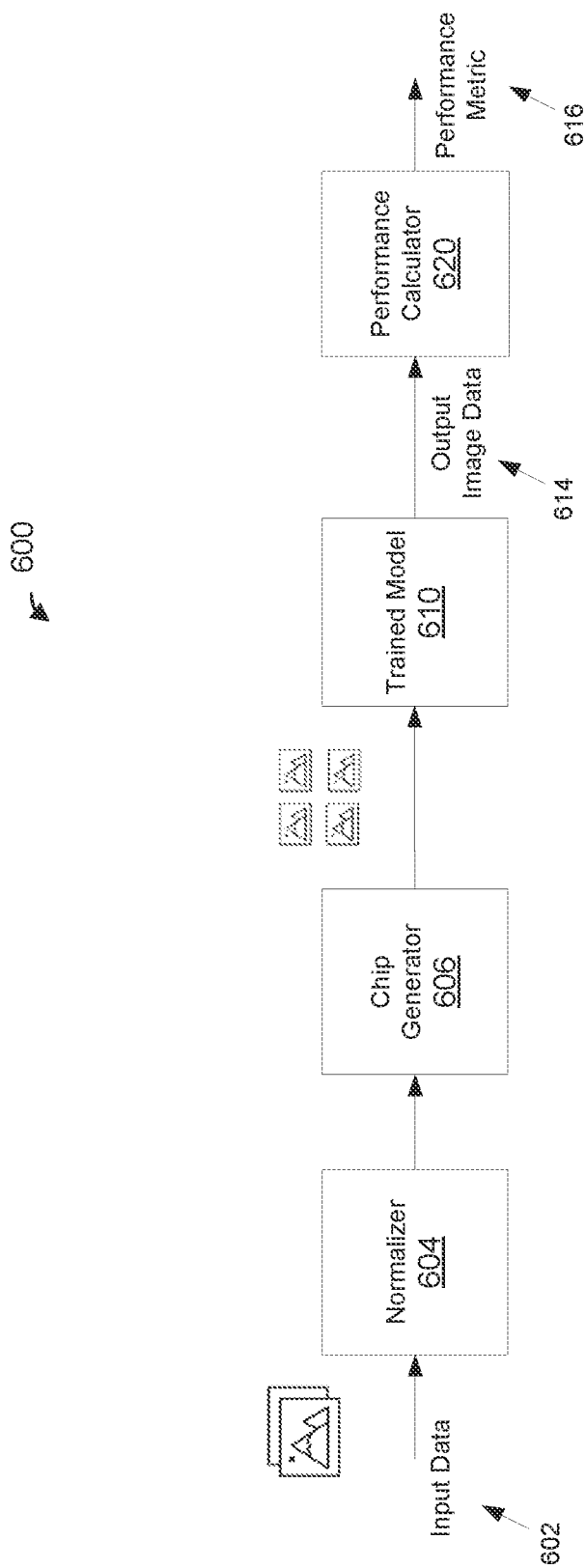
FIG. 6 is a block diagram of an example image spectral band translation model performance evaluation system, in accordance with aspects of the present disclosure.

FIG. 6 is a block diagram of an example image spectral band translation model performance evaluation system 600, in accordance with aspects of the present disclosure. The image translation model performance evaluation system 600 is generally the same as the image spectral band translation system 300 of FIG. 3 and includes like-numbered elements with the image spectral band translation system 300 of FIG. 3. Additionally, the image translation model performance evaluation system 600 includes a performance calculator 620 that may be configured to generate performance metrics 616 based in a comparison of image data in the one or more second spectral bands generated by the trained model 610 with image data corresponding to a corresponding actual image in the one or more second spectral bands. In an aspect, the performance calculator 620 is configured to calculate a mean absolute error (MAE) performance metric 616 according to $$MAE = \frac{\sum_{i=1}^{n} |y_i - x_i|}{n} = \frac{\sum_{i=1}^{n} |e_i|}{n}. \qquad \text{Equation 1}$$

where $y_i$ is a pixel value generated by the trained model 610 and $x_i$ is a pixel value of a corresponding actual image, and where i is the pixel index. In other aspects, other suitable performance metrics may be utilized.

Figure 7:
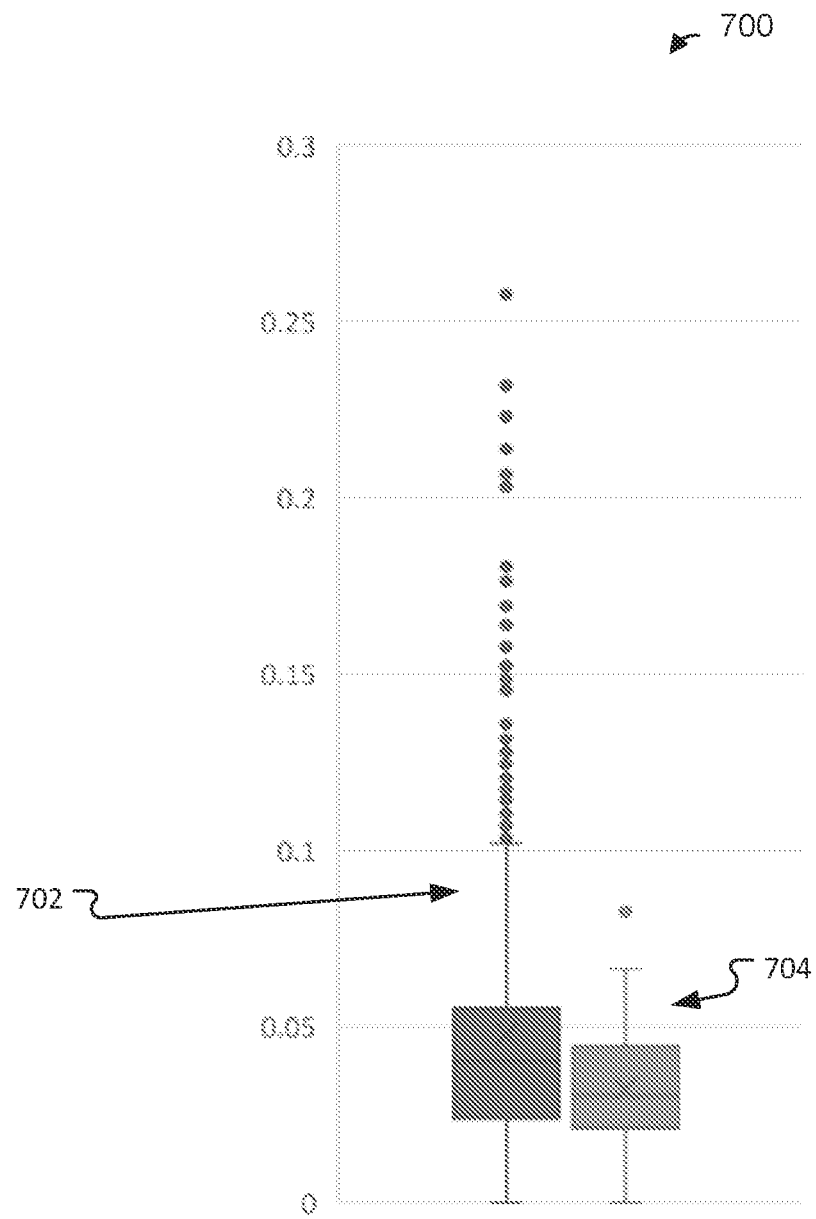
FIG. 7 is a plot depicting training performance of several example image spectral band translation model, in accordance with aspects of the present disclosure.

FIG. 7 shows plots 700 depicting performance of several example image spectral band translation models, in accordance with aspects of the present disclosure. The plots 700 include a first plot 702 depicting performance of an image translation model trained to translate image data in the red, green, and blue bands into an image in the cirrus band. The plots 700 also include a second plot 704 depicting performance of an image translation model trained to translate image data in the red-edge 3 band, the NIR narrow band and the water vapor bands, as selected by the feature selection model 500, into an image in the cirrus band. The plots 702, 704 depict the trained image translation model performance as measured by the MAE performance metric calculated according to Equation 1. As can be seen from the plots 702, 704, both the model trained to translate image data in the red, green, and blue bands into an image in the cirrus band and the model trained to translate image data in the red-edge 3 band, the NIR narrow band and the water vapor bands into the image in the cirrus band generally perform well with mean absolute error being below 0.3. As can be also seen from the plots 702, 704, in an aspect, the model trained to translate image data in the red-edge 3 band, the NIR narrow band and the water vapor bands, as selected by the feature selection model 500, into an image in the cirrus band perform relatively better than the model trained to translate image data in the red, green, and blue bands into an image in the cirrus band.

Figure 8:
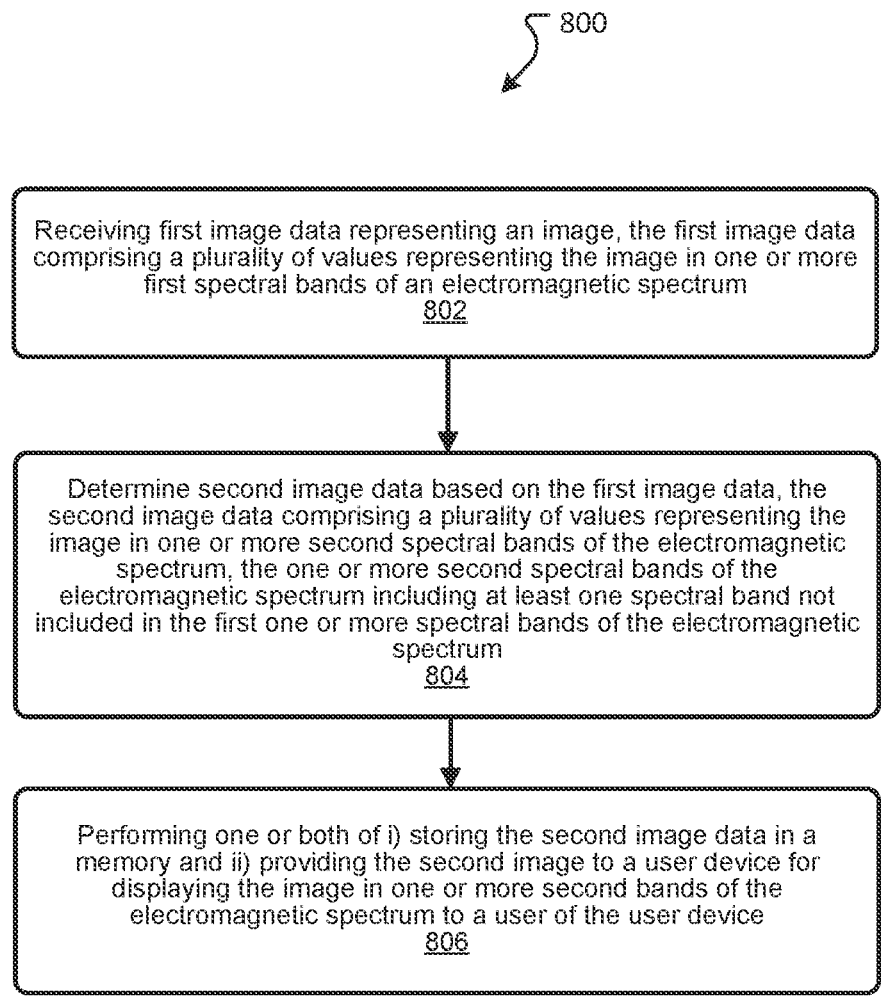
FIG. 8 is a block diagram of an example method for performing image spectral band translation, in accordance with aspects of the present disclosure.

FIG. 8 is a block diagram of an example method 800 for performing image spectral band translation, in accordance with aspects of the present disclosure. A general order for the steps of the method 800 is shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7.

At block 802, first image data representing an image is received. The first image data comprising a plurality of values representing the image in one or more first spectral bands of an electromagnetic spectrum. In an aspect, the first input image data includes respective sets of image data values for respective ones of the one or more first spectral bands. In an aspect, the first image data corresponds to an RGB image and includes respective sets of image data values for respective ones of the red, the green and the blue spectral bands. In other aspects, the first image data corresponds to an RGB image and includes respective sets of image data values for a subset of the red, the green and the blue spectral bands, wherein the subset excludes one or more of the red spectral band, the green spectral and the blue spectral band. In yet another example, the first image data corresponds to a false color image and includes respective sets of image data values for respective spectral bands including at least one spectral band other than the red spectral band, the green spectral band and/or the blue spectral band.

At block 804, second image data is determined based on the first image data received at block 802. The second image data comprises a plurality of values representing the image in one or more second spectral bands of the electromagnetic spectrum, where the one or more second spectral bands of the electromagnetic spectrum include at least one spectral band not included in the one or more first spectral bands of the electromagnetic spectrum. In an aspect, the second image is determined using an image spectral band translation model. In an aspect, the image spectral band translation model comprises a suitable neural network. For example, the image spectral band translation model comprises a generative adversarial neural network. In an aspect, the image spectral band translation model comprises a conditional generative adversarial network.

At block 806, the second image data is stored in a memory. For example, the second image data is stored as a part of a training data set that may subsequently be used for training suitable computer vision models with image data in the one or more second spectral bands. Additionally or alternatively, the second image data is provided, in some form, to a user device for displaying the image in one or more second bands of the electromagnetic spectrum to a user of the user device. For example, the second image data is transmitted, in some form, to the user device via a network.

Figure 9:
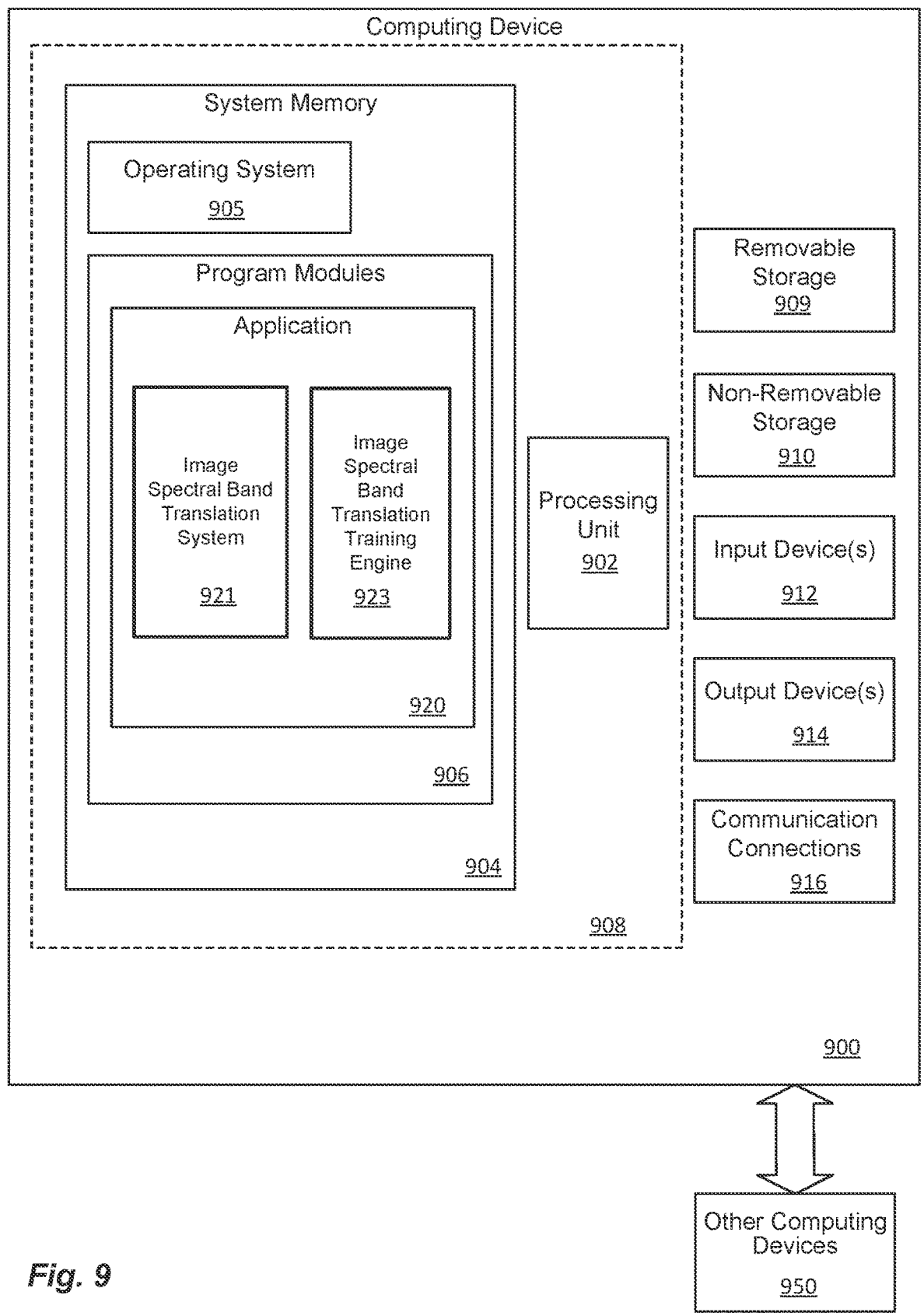
FIG. 9 is a block diagram illustrating physical components (e.g., hardware) of a computing device with which aspects of the disclosure may be practiced.

FIGS. 9-10 and the associated descriptions provide a discussion of a variety of operating environments in which aspects of the disclosure may be practiced. However, the devices and systems illustrated and discussed with respect to FIGS. 9-10 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store an image spectral band translation system 921 (e.g., corresponding to the image spectral band translation system 121 or of FIG. 1) and/or an image spectral band translation training engine 923 (e.g., corresponding to the image spectral band translation training engine 123 or of FIG. 1). The operating system 905, for example, may be suitable for controlling the operation of the computing device 900.

Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the at least one processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
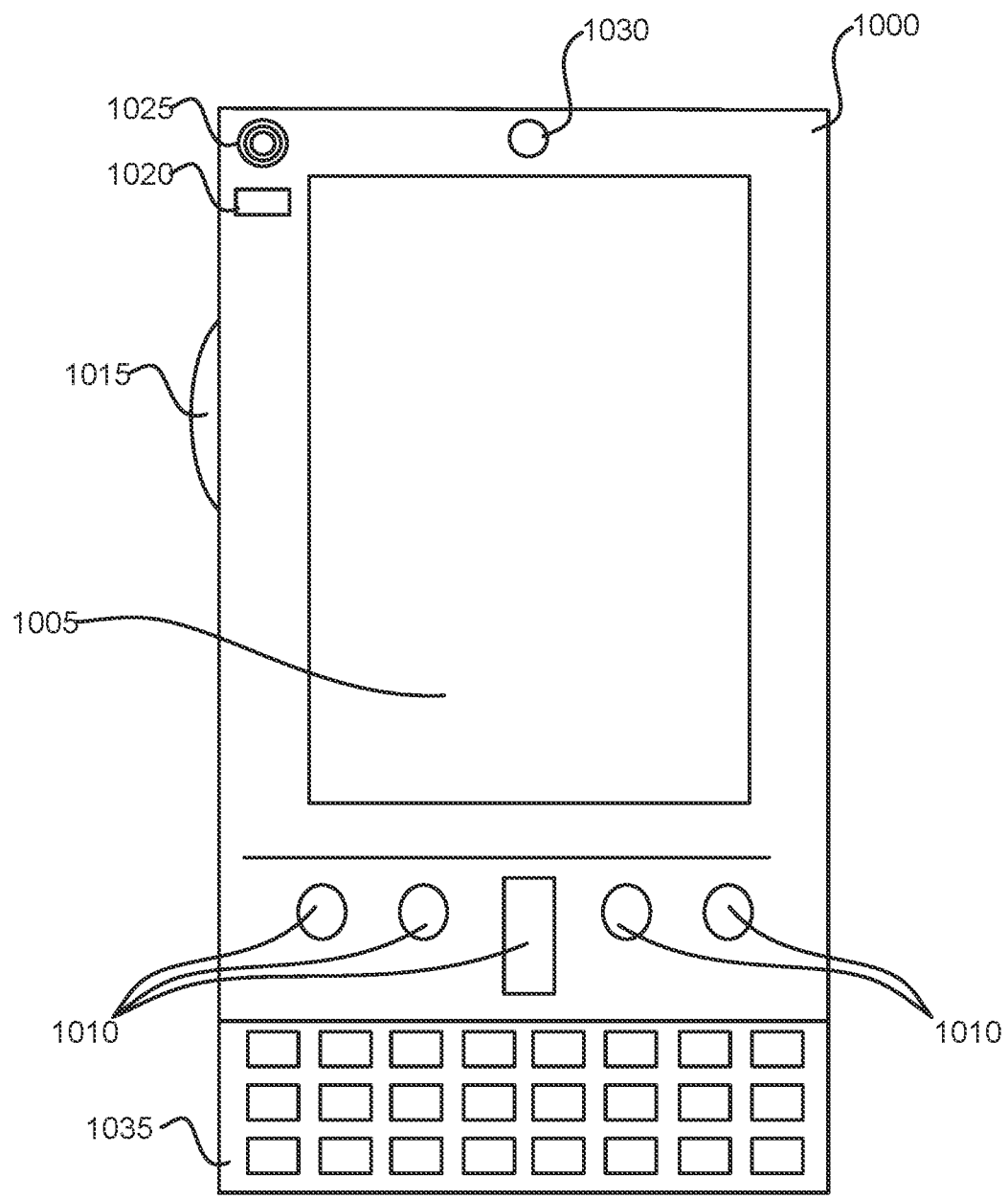
FIGS. 10A-10B illustrate a mobile computing device with which aspects of the disclosure may be practiced.
Figure 10B:
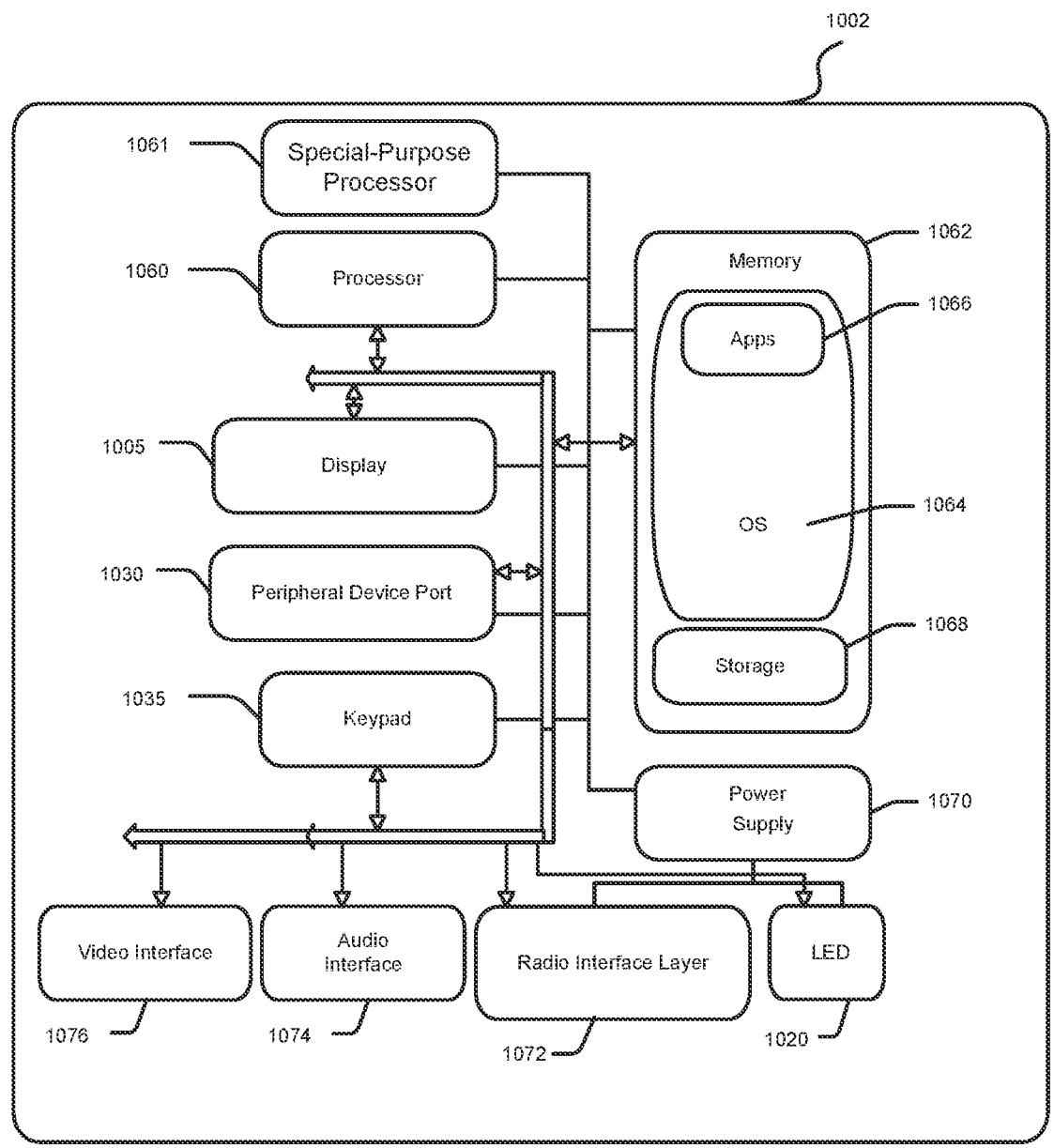

FIGS. 10A-10B illustrate a mobile computing device 1000, for example, a mobile telephone, a smart phone, wearable computer (such as a smart watch), a tablet computer, a laptop computer, and the like, with which aspects of the disclosure may be practiced. In some aspects, the client (e.g., computing system 104A-E) may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some aspects. In yet another alternative aspect, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external source.

FIG. 10B is a block diagram illustrating the architecture of one aspect of computing device, a server, or a mobile computing device. That is, the computing device 1000 can incorporate a system (e.g., an architecture) 1002 to implement some aspects. The system 1002 can implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated configuration, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for processing images, the method comprising:
   receiving first image data of a scene, the first image data comprising a first plurality of values representing the scene in a first spectral band of an electromagnetic spectrum;
   generating, using a trained machine learning model, second image data based on the first image data, the second image data comprising a second plurality of values representing the scene in a second spectral band of the electromagnetic spectrum, the second spectral band of the electromagnetic spectrum being different from the first spectral band of the electromagnetic spectrum; and
   constructing a multispectral image of the scene based upon the first image data and the second image data, where the multispectral image includes the first image data and the second image data.

2. The method of claim 1, where the trained machine learning model is trained to translate the first image data into the second image data.

3. The method of claim 2, wherein the trained machine learning model comprises a conditional generative adversarial network.

4. The method of claim 1, wherein
   the first spectral band includes red, green, and blue spectral bands of the electromagnetic spectrum, and
   the second spectral band includes a shortwave infrared (SWIR) band of the electromagnetic spectrum.

5. The method of claim 1, wherein
   the first spectral band comprises red, green, and blue spectral bands of the electromagnetic spectrum, and
   in the second spectral band comprises a narrow infrared (NIR) band of the electromagnetic spectrum.

6. The method of claim 1, wherein
   receiving the first image data comprises receiving a subset of image data obtained to capture the image, the subset of image data excluding image data corresponding to a third spectral band obtained to capture the image, and
   generating the second image data comprises generating, based on the subset of image data, image data corresponding to the third spectral band of the electromagnetic spectrum excluded from the subset of image data obtained to capture the image, and generating the image based on the generated image data corresponding to the third spectral band.

7. The method of claim 6, wherein receiving the subset of image data comprises receiving respective pluralities of values corresponding to one or more spectral bands among a set of spectral bands including red, green, and blue spectral bands capturing a red, green, blue (RGB) image, and generating the second image data comprises generating, based on the received respective pluralities of values corresponding to two spectral bands among the set of spectral bands including red, green, and blue spectral bands capturing the RGB image, a plurality of values corresponding to one or more other spectral bands among the set of spectral bands including red, green, and blue spectral bands capturing the RGB image, and generating the RGB image based on the received respective pluralities of values corresponding to two spectral bands among the set of spectral bands including red, green, and blue spectral bands capturing the RGB image and the generated third one of the set of spectral bands including red, green, and blue spectral bands capturing the RGB image.

8. The method of claim 1, further comprising training the machine learning model to translate image data from the first spectral band to the second spectral band.

9. The method of claim 8, further comprising selecting, using a feature selection model, the first spectral band for translation of image data into the second spectral band.

10. A system comprising:

one or more computer readable storage media; and program instructions stored on the one or more computer readable storage media that, when executed by at least one processor, cause the at least one processor to:

receive training images, train a machine learning model based on the training images to translate image data in a first spectral band of an electromagnetic spectrum to image data in a second spectral band in the electromagnetic spectrum, the second spectral band being different from and failing to overlap with the first spectral band, and store the trained machine learning model in a memory for subsequent use of the trained machine learning model to translate image data in the first spectral band of the electromagnetic spectrum to image data in the second spectral band in the electromagnetic spectrum.

11. The system of claim 10, wherein the program instructions, when executed by the at least one processor, further cause the at least one processor to evaluate performance of the trained machine learning model using a mean absolute error calculation.

12. The system of claim 10, wherein the program instructions, when executed by the at least one processor, cause the at least one processor to train the machine learning model at least by training a conditional generative adversarial network.

13. The system of claim 10, wherein the program instructions, when executed by the at least one processor, further cause the at least one processor to select, using a feature selection model, the first spectral band for translation of image data into the second spectral band.

14. The system of claim 10, wherein the program instructions, when executed by the at least one processor, further cause the at least one processor to receive first image data of a scene, the first image data comprising a first plurality of values representing the scene in the first spectral band of the electromagnetic spectrum;

generating, using the trained machine learning model, second image data of the scene based on the first image data, the second image data comprising a second plurality of values of the scene in the second spectral band of the electromagnetic spectrum; and constructing a multispectral image of the scene based upon the first image data and the second image data, where the multispectral image includes the first image data and the second image data.

15. The system of claim 10, where the first spectral band comprises red, green, and blue spectral bands of the electromagnetic spectrum, and in the second spectral band comprises a shortwave infrared (SWIR) band of the electromagnetic spectrum.

16. The system of claim 10, where the first spectral band comprises red, green, and blue spectral bands of the electromagnetic spectrum, and in the second spectral band comprises a near infrared (NIR) band of the electromagnetic spectrum.

17. A computer-readable storage medium storing computer-executable instructions that when executed by at least one processor cause a computer system to:

receive first image data of a scene, the first image data comprising a first plurality of values representing the scene in a first spectral band of an electromagnetic spectrum;

generate, using a machine learning model, second image data based on the first image data, the second image data comprising a second plurality of values representing the scene in a second spectral band of the electromagnetic spectrum, the second spectral band of the electromagnetic spectrum being different from and failing to overlap with the first spectral band of the electromagnetic spectrum; and constructing a multispectral image of the scene based upon the first image data and the second image data, where the multispectral image includes the first image data and the second image data.

18. The computer-readable storage medium of claim 17, wherein the machine learning model comprises a generative adversarial network.

19. The computer-readable storage medium of claim 17, wherein the machine learning model comprises a conditional generative adversarial network.

20. The computer-readable storage medium of claim 17, wherein the first spectral band comprises red, green, and blue spectral bands of the electromagnetic spectrum, and in the second spectral band comprises a shortwave infrared (SWIR) band of the electromagnetic spectrum.

\* \* \* \* \*